Oct. 23, 1928.
E. H. DANIEL
1,688,615
LEVELING DEVICE FOR PLOWS
Filed Oct. 9, 1926   2 Sheets-Sheet 1
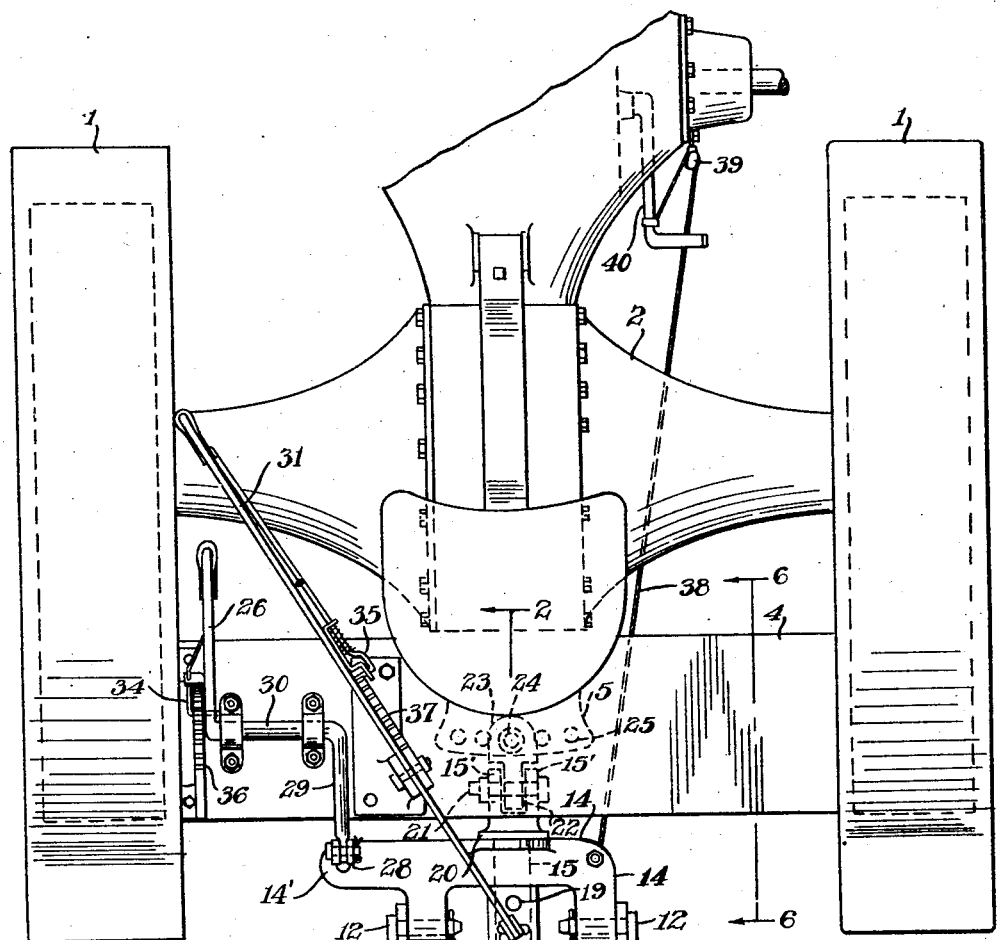
Fig.1.
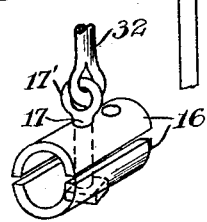
Fig.3.
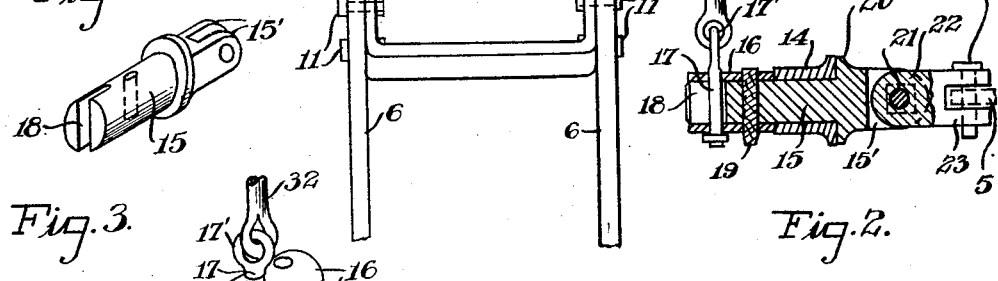
Fig.2.
Fig.4.
INVENTOR.
Earle H. Daniel
BY
ATTORNEYS.

Oct. 23, 1928.  1,688,615
E. H. DANIEL
LEVELING DEVICE FOR PLOWS
Filed Oct. 9, 1926   2 Sheets-Sheet 2
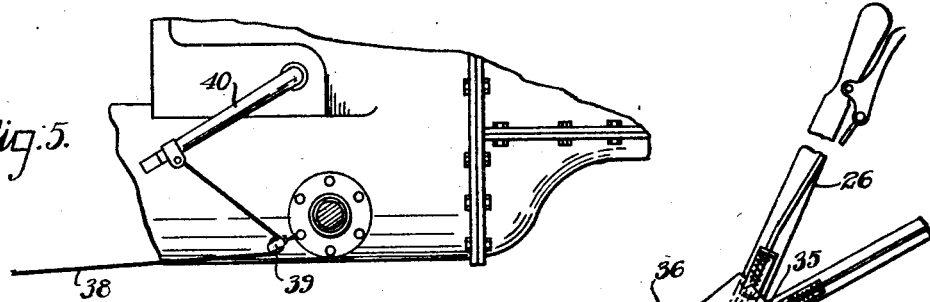
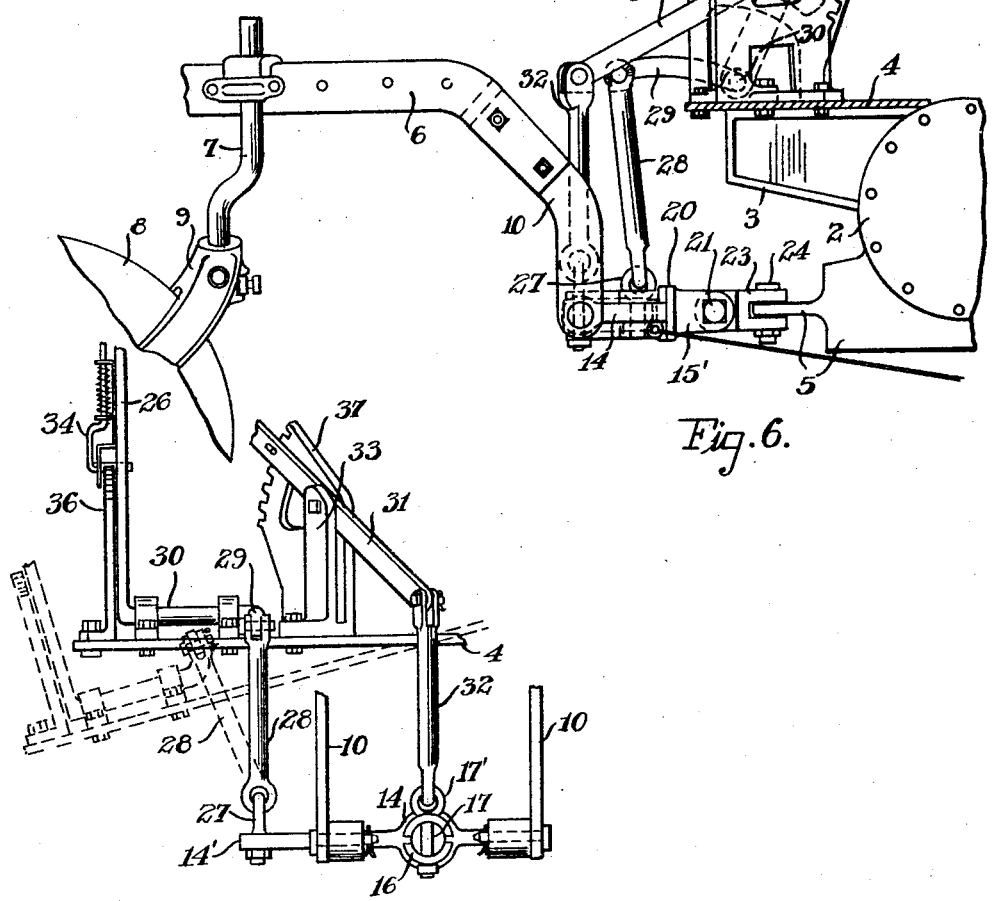
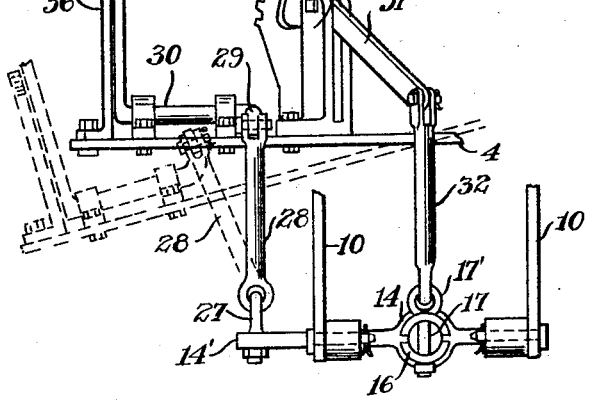
INVENTOR.
Earle H. Daniel
BY
ATTORNEYS.

Patented Oct. 23, 1928.

1,688,615

UNITED STATES PATENT OFFICE.

EARLE H. DANIEL, OF SPRINGFIELD, OHIO, ASSIGNOR TO ROBERT W. JOHNSTON, OF COLUMBUS, OHIO.

LEVELING DEVICE FOR PLOWS.

Application filed October 9, 1926. Serial No. 140,638.

My invention relates to improvements in plows or other ground breaking devices, it particularly relating to devices for hitching the plow to a tractor, leveling the plow in its relation to the ground, regulating the depth of penetration and connecting the plow with the tractor in a way to permit the same to become automatically uncoupled when the plow meets an obstruction and at the same time automatically arresting the motion of the tractor.

One of the objects of my invention is to provide draft appliances of a simple and effective character for hitching a wheel-less plow or other ground breaking device to a conventional type of tractor at the rear of the rear wheels thereof in a way which will utilize the conventional draw-bar of the tractor and permit the plow to follow the true line of draft and at the same time eliminate torsional stresses occasioned by the uneven travel of the tractor and implement and allow for the necessary lateral swinging of the tractor and implement in turning.

A further object of the invention is to provide simple and effective means for leveling the plow with relation to the ground.

A further object of the invention is to provide simple and effective means for regulating the depth of penetration of the plow.

A further object of the invention is to provide simple and effective means for automatically disconnecting the plow and tractor when an undue stress is brought upon the hitching devices by the plow meeting an obstruction in the ground and for automatically stopping the tractor under such conditions.

Further objects of the invention will appear from the accompanying description and claims.

In the accompanying drawings:

Fig. 1 is a top plan view of so much of a tractor as is necessary to ilustrate my improvements showing the improved devices applied thereto.

Fig. 2 is a section on the line 2—2 of Fig. 1.

Fig. 3 is a perspective view of the connecting shaft of the hitch device.

Fig. 4 is a perspective view of the split sleeve which serves to connect the plow beams with the shaft.

Fig. 5 is a side elevation of a portion of the tractor showing the clutch pedal and cable which connects the pedal with the implement.

Fig. 6 is a longitudinal section on the line 6—6 of Fig. 1 showing in addition a portion of the plow.

Fig. 7 is a rear elevation of a portion of the device.

Referring to the drawings, 1 represents the rear drive wheels, 2 the rear axle and differential housing, 3 a bracket attached to the housing and supporting a platform 4, 5 the tractor draw-bar, 6 the beams of a plow, 7 one of the standards which supports the ground breaking devices, a portion of one of which is shown in the present case in the form of a colter 8, journaled in the arms of a fork 9 which is attached to the standard 7. The forward ends of the beams 6 are rigidly connected with a U-shaped hitch plate 10 by bolts 11 which serves to space the beams apart. The arms of this hitch plate extend forwardly and downwardly and are pivotally connected by transverse pins 12 with the rearwardly extending arms 13 of a transversely extending bracket 14, one end of which has a lateral extension 14'. The bracket 14 has a longitudinal bore (Fig. 2) to receive a coupling pin 15. Clamped to the rear end of the coupling pin is a two-part collar 16; a bolt 17 having an eye 17' passing transversely through the two members of the collar and also through a slot 18 in the coupling pin serving to clamp the collar to the coupling pin. The collar and coupling pin are also connected together by a wooden connecting pin 19 and it will be noticed that the slot 18 extends to the extreme rear end of the coupling pin. The bracket 14 is confined between this split collar 16 and the integral collar 20 on the coupling pin. The forward end of the coupling pin has a bifurcated head which receives and has pivotally connected therewith by a transversely extending bolt or pin 21 the tongue 22 of a clevis 23, the forward end of which is pivotally connected by a vertically extending pin 24 with any one of a series of openings 25 in the tractor draw-bar 5.

Connected with the lateral extension 14' of the leveling bracket 14 is a hand lever 26, the connection being through the eye bolt 27, line 28, crank arm 29 and shaft 30 which is mounted in suitable bearings upon the platform 4. To regulate the depth of planting, a lever 31 is provided which is connected to the eye of the bolt 17 through the link 32; the lever being pivotally supported on the standard 33, placed on the platform 4. Each of the levers has a spring-pressed dog 34 and 35 which cooperate respectively with two segments 36 and 37 to hold the levers in different positions of adjustment.

The leveling bracket 14 has connected with one end thereof a cable 38 which extends forwardly and is passed about a pulley 39 secured to the axle housing and then connected with the free end of the clutch pedal 40.

The operation is as follows: It will be observed that the plow beam is connected to the hitch devices for vertical movement by the transverse pins 12 and also for swiveling movement through the leveling bracket and coupling pin 15. It will also be noticed that the coupling pin is connected with the tractor draw-bar for vertical movement through the transverse pin 21 and for lateral swinging movement through the vertical pin 24. This arrangement permits the plow to freely follow the true line of draft, and also permits either side of the tractor or plow to rise and fall independently of each other without torsional stresses.

When one of the tractor wheels is traveling higher than the other wheel due to unevenness in the ground or the fact that one wheel is running on plowed ground and the other on unplowed ground, it is necessary for best results to level the plow with relation to the ground and this is accomplished through the lever 26 and connections described with the leveling bracket, this leveling bracket swiveling about the coupling pin 15 for the purpose.

To regulate the depth of penetration, the hitch devices are raised or lowered by the lever 31, the coupling pin 15 swinging about the transverse pivot 21 and the leveling bracket and hitch plate 10 swinging about the transverse pins 12.

When the plow meets with an obstruction of such a nature as would be liable to cause breakage of the parts, the plow will be automatically disconnected from the tractor by the breaking of the wooden pin 19 which allows the clamping collar 16 to slide from the coupling pin 15. The strain of draft is preferably about equally divided between the pin 19 and the clamp collar so that the wooden pin will be relieved from the entire duty of connecting the hitch devices with the plow, but any undue strain will readily shear the pin and thereafter slide the collar from the coupling pin. This permits the leveling bracket which is connected to the beams to slide from the coupling pin and by reason of the connection of the bracket with the clutch pedal of the tractor through the cable 38 the tractor clutch will be thrown out and the tractor immediately stopped.

Having thus described my invention, I claim:

1. In a structure of the character described, the combination, with an implement beam and a tractor and a draw-bar arranged at the rear thereof, of a leveling bracket pivotally connected with the beam by transversely arranged pivots, a coupling pin universally connected with said draw-bar, said leveling bracket being swivelly mounted upon said coupling pin, and an operating device mounted on the tractor and connected with one side of said leveling bracket.

2. In a structure of the character described, the combination, with an implement beam and a tractor having a draw-bar at its rear end, of a leveling bracket connected with said beam through a pair of aligned transversely arranged pivot pins, a coupling pin, a clevis connected with said coupling pin by a transverse pivot and connected with said tractor draw-bar by a vertical pivot, said leveling bracket being swivelly mounted on said coupling pin, together with means for holding the same thereon, an operating device mounted on said tractor pivotally connected with one side of said leveling bracket, and a second operating device mounted on said tractor and connected with said parts to raise or lower the forward end of said beam.

3. In a structure of the character described, the combination, with an implement beam and a tractor having a draw-bar at its rear end, a coupling pin pivotally connected with said draw-bar, said beam having a part swivelly mounted upon said coupling pin, and means yieldable under undue strain on said beam for securing said beam part on said pin.

4. In a structure of the character described, the combination with an implement beam and a tractor having a draw-bar at its rear end, of a coupling pin pivotally connected to said draw-bar, said beam having a part swivelly mounted upon said coupling pin, a collar slidably mounted upon the rear end of said coupling pin, and breakable means for securing said collar to said pin.

5. In a structure of the character described, the combination, with an implement beam and a tractor having a draw-bar at its rear end, of a coupling pin pivotally connected to said draw-bar, said beam having a part swivelly mounted upon said coupling pin, a two-part collar, together with means for clamping the same to the rear end of said coupling pin, additional breakable means for securing said collar to said pin, said collar when said breakable means is destroyed being adapted to slide from said pin and to permit said beam part to also slide therefrom.

6. In a structure of the character described, the combination with an implement beam and a tractor having a draw-bar at its rear end, a coupling pin, a member pivotally connected with said beam by transverse pivots and swively mounted upon said coupling pin, a two-part collar, an eye bolt passing through the parts of said collar and through the open ended slot in said pin for detachably connecting said collar with said pin, a lever mounted on said tractor having a pivotal connection with the eye of said bolt.

In testimony whereof, I have hereunto set my hand this 27th day of September, 1926.

EARLE H. DANIEL.